US009559956B2

(12) United States Patent
Raghuraman et al.

(10) Patent No.: US 9,559,956 B2
(45) Date of Patent: Jan. 31, 2017

(54) SHARING BANDWIDTH AMONG MULTIPLE USERS OF NETWORK APPLICATIONS

(75) Inventors: Anand Raghuraman, Campbell, CA (US); Alok Kumar, Fremont, CA (US); Uday Naik, Fremont, CA (US); Aspi Siganporia, Saratoga, CA (US); Sushant Jain, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 737 days.

(21) Appl. No.: 13/364,705

(22) Filed: Feb. 2, 2012

(65) Prior Publication Data

US 2012/0195324 A1    Aug. 2, 2012

Related U.S. Application Data

(63) Continuation-in-part of application No. 13/018,967, filed on Feb. 1, 2011.

(51) Int. Cl.
*H04L 12/28* (2006.01)
*H04L 12/70* (2013.01)
*H04W 72/04* (2009.01)

(52) U.S. Cl.
CPC .......... *H04L 47/00* (2013.01); *H04W 72/0446* (2013.01)

(58) Field of Classification Search
None
See application file for complete search history.

(56) References Cited

U.S. PATENT DOCUMENTS

| 6,324,184 | B1 | 11/2001 | Hou et al. |
| 7,072,295 | B1 * | 7/2006 | Benson ............... H04L 12/5693 370/230 |
| 7,778,194 | B1 * | 8/2010 | Yung ................ H04L 12/2602 370/235 |
| 7,848,234 | B2 | 12/2010 | McKinnon, III et al. |
| 8,503,428 | B2 * | 8/2013 | Bajaj ...................... H04L 49/25 370/351 |
| 2002/0023117 | A1 | 2/2002 | Bernardin et al. |
| 2002/0143952 | A1 | 10/2002 | Sugiarto et al. |
| 2003/0005074 | A1 | 1/2003 | Herz et al. |
| 2003/0081626 | A1 | 5/2003 | Naor et al. |
| 2003/0120934 | A1 * | 6/2003 | Ortiz .................. H04L 63/0861 713/186 |

(Continued)

FOREIGN PATENT DOCUMENTS

| EP | 1919220 A2 | 5/2008 |
| WO | WO-2004/036371 A2 | 4/2004 |

OTHER PUBLICATIONS

ISR dated Sep. 25, 2012 for PCT/US2012/023288.

(Continued)

*Primary Examiner* — Kwang B Yao
*Assistant Examiner* — Hardikkumar Patel
(74) *Attorney, Agent, or Firm* — McDermott Will & Emery LLP

(57) ABSTRACT

A system and method are provided that allocate bandwidth on a global large scale network. Bandwidth allocation is based on the predicted bandwidth demands of the network users. Each user may be assigned one of a plurality of different values that determines the amount of bandwidth allocated to that user. In instances where an application runs on behalf of a plurality of remote clients, a system and method is provided that allows for the allocation of bandwidth based each individual remote client.

11 Claims, 10 Drawing Sheets

(56) References Cited

U.S. PATENT DOCUMENTS

| | | | |
|---|---|---|---|
| 2004/0192239 A1* | 9/2004 | Nakao | H04B 7/0615 455/136 |
| 2005/0052992 A1 | 3/2005 | Cloonan et al. | |
| 2007/0041384 A1 | 2/2007 | Das et al. | |
| 2007/0223422 A1* | 9/2007 | Kim | H04B 7/0417 370/334 |
| 2007/0263625 A1* | 11/2007 | Engstrand | 370/390 |
| 2008/0037556 A1* | 2/2008 | Denney | H04L 12/2801 370/395.42 |
| 2008/0103861 A1 | 5/2008 | Zhong | |
| 2009/0316578 A1 | 12/2009 | Mang et al. | |
| 2010/0071024 A1* | 3/2010 | Eyada | H04L 63/0263 726/1 |
| 2010/0172267 A1 | 7/2010 | Viorel et al. | |
| 2010/0220745 A1* | 9/2010 | Lauwers | H04L 41/0896 370/468 |
| 2010/0306353 A1* | 12/2010 | Briscoe | H04L 41/0806 709/221 |
| 2011/0013506 A1* | 1/2011 | Ishii | H04W 72/1242 370/208 |
| 2011/0087765 A1 | 4/2011 | Musgrave et al. | |
| 2011/0096666 A1* | 4/2011 | Davari | H04L 47/10 370/235 |
| 2011/0173327 A1* | 7/2011 | Chen | G06F 9/5066 709/226 |
| 2011/0295999 A1* | 12/2011 | Ferris | G06F 9/5072 709/224 |
| 2012/0149418 A1* | 6/2012 | Skubic | H04L 47/2416 455/509 |

OTHER PUBLICATIONS

Extended European Search Report dated Dec. 1, 2015 in European Patent Application No. 15182302.8.
First Office Action issued Aug. 11, 2015 in Chinese Patent Application No. 201280015806.7.
U.S. Appl. No. 13/018,967, filed Feb. 1, 2011.
U.S. Appl. No. 14/657,480, filed Mar. 13, 2015.
US Office Action issued Dec. 5, 2012 in U.S. Appl. No. 13/018,967.
US Office Action issued Jul. 31, 2013 in U.S. Appl. No. 13/018,967.
US Office Action issued Aug. 15, 2014 in U.S. Appl. No. 13/018,967.
US Notice of Allowance issued Dec. 17, 2014 in U.S. Appl. No. 13/018,967.
English Translation of JP Office Action issued Jan. 5, 2016 in Japanese Patent Application No. 2013-552576.
Katayama, Takayuki, et al. A Proposal of Traffic Management Methods on the ALL-IP network in Next-generation Mobile Communication, [DVD-ROM] Ver. 1. 1, 1997-2006, Multimedia, Distributed, Cooperative and Mobile (DICOMO) Symposium, Information Processing Society of Japan, Apr. 7, 2009, vol. 2004, pp. 671-674 (partial English translation).
Office Action issued Aug. 11, 2015 in Chinese Patent Application No. 201280015806.7.

* cited by examiner

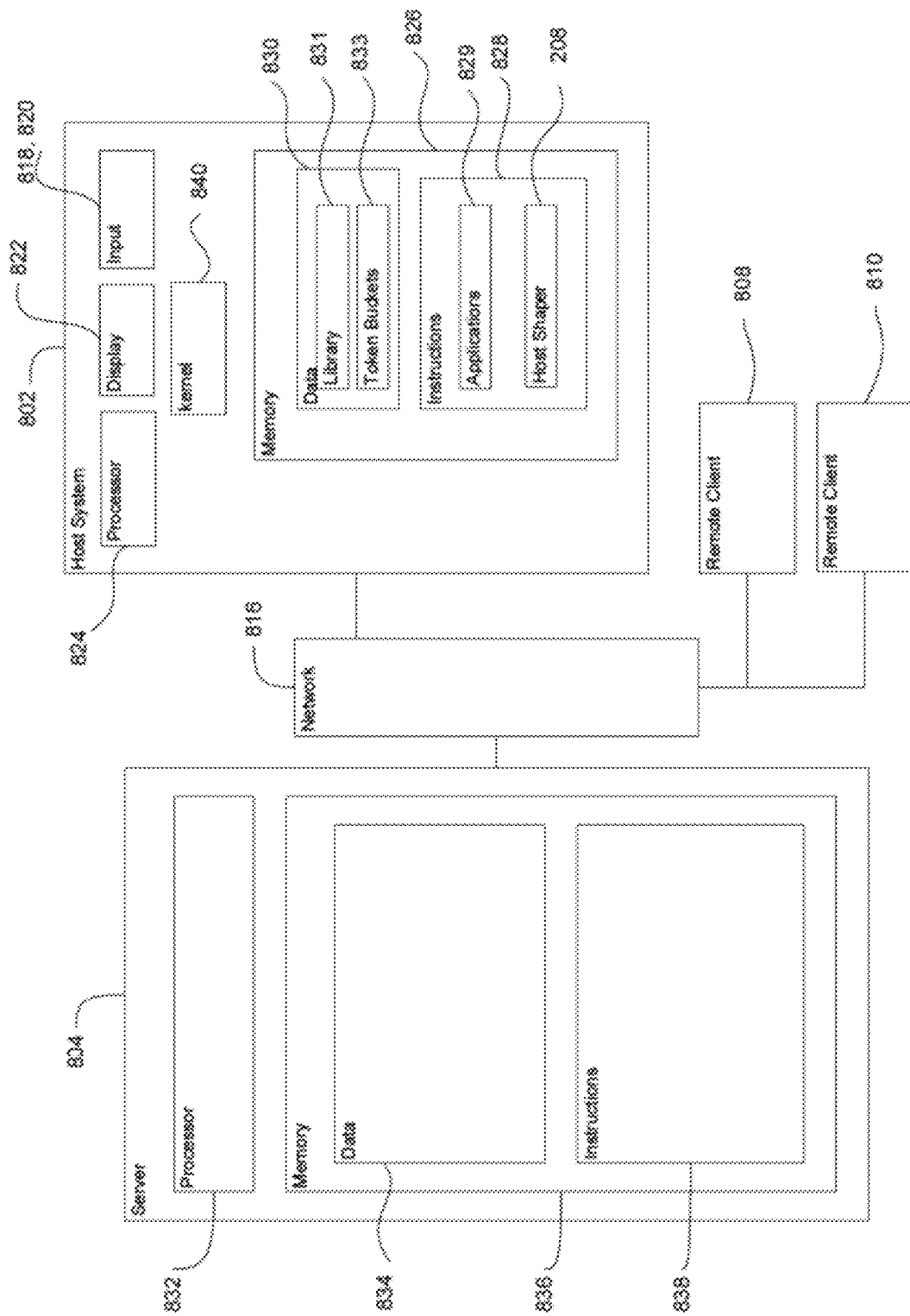

SHARING BANDWIDTH AMONG MULTIPLE USERS OF NETWORK APPLICATIONS

CROSS-REFERENCE TO RELATED APPLICATIONS

The present application is a continuation-in-part of U.S. patent application Ser. No. 13/018,967, filed on Feb. 1, 2011, the disclosure of which is incorporated herein by reference.

BACKGROUND

Large scale networks support a wide variety of applications and services. Such networks may include multiple devices distributed across links in an interconnection network or switch fabric. Each node of the network may include a switch (e.g., a router) or an endpoint (e.g., a host device). Network congestion can occur when a link or node carries too much data so as to cause deterioration in the quality of service. Typically, the effects of network congestion include queuing delay, packet loss, or the blocking of new connections. Congestion across the network can be controlled by protocols, such as the Transmission Control Protocol ("TCP"), which maintains a similar bandwidth for competing connections. TCP also ensures that the overall transmission rates are less than the link capacity.

One of the limitations of TCP is that it focuses on the number of connections being made to an endpoint at any given time. Accordingly, a user of the network can easily access additional bandwidth by simply implementing additional connections to the network. This practice is becoming increasingly prevalent in larger scale distributed systems where a user's job is spread across many machines. For example, if a first user is running a job on 100 machines and a second user is running a job on 10 machines, the first user may have access to 10 times the bandwidth of the second user. This is not desirable for many networks, as it creates what is considered an unfair allocation of bandwidth.

BRIEF SUMMARY

The present description relates generally to the management of bandwidth in a network. Aspects relate to predicting demand for each user in a network, and allocating bandwidth to each user based on a desired bandwidth allocation policy. In instances when an application is running on behalf of multiple remote clients, a system and method are provided that allow for the allocation of bandwidth for each individual remote client.

One aspect provides a method of allocating bandwidth over a network, including receiving a request for a shared-service application to run on a host device on behalf of a plurality of remote clients; receiving an estimation of network traffic associated with running the application for each remote client; classifying the remote clients, based at least in part on the received estimation, as either being in a first classification or a second classification; transmitting classifications of the remote clients to the host device; and allocating bandwidth for the application, wherein remote clients with a first classification are allocated bandwidth individually, and wherein the remote clients receiving the second classification are provided bandwidth as part of a group.

Another aspect provides for determining whether each of the remote client's estimated network traffic is above a predetermined threshold; classifying all remote clients with estimated network traffic above the predetermined threshold with the first classification; and classifying all remote clients with estimated network traffic that is not above the predetermined threshold with the second classification.

Yet another aspect provides for aggregating the network traffic associated with each of the remote clients to create a network traffic total; selecting the remote clients in an order of descending network traffic; upon selecting each remote client, aggregating the network traffic for all selected remote clients; stopping the selection of remote clients when the selected remote clients have an aggregated network traffic that is above a predetermined fraction of the network traffic total; classifying all selected remote clients with the first classification; and classifying all remote clients that have not been selected with the second classification.

Still another aspect allows for providing bandwidth for remote clients having the first classification based, at least in part, on a weight value associated with the remote clients; receiving bandwidth usage information for a plurality of shared-service applications running on behalf of a plurality of remote clients; aggregating bandwidth usage information to determine a total bandwidth demand; detecting congested links within the network; and dividing the network's available bandwidth between the plurality of applications based, at least in part, on a weight value associated with the remote clients. In addition, bandwidth demand information may be based on the peak bandwidth usage of the shared-service applications over a predetermined time period.

Another aspect provides for determining that all network bandwidth demand is being met; determining that unused bandwidth is available on the network; and dividing the unused bandwidth among the remote clients in proportion to the remote client's weight values. In addition, a portion of network bandwidth may remain exempt from the operations to create bandwidth allocations.

Yet another aspect provides for a network device for allocating bandwidth over a network, the device including a memory; and a processor coupled to the memory, the processor configured to execute instructions to: receive a request for a shared-service application to run on a host device on behalf of a plurality of remote clients; receive an estimation of network traffic associated with running the application for each remote client; classify the remote clients, based at least in part on the received estimation, as either being in a first classification or a second classification; transmit classifications of the remote clients to the host device; and allocate bandwidth for the application, wherein remote clients with a first classification are allocated bandwidth individually, and wherein the remote clients receiving the second classification are provided bandwidth as part of a group. The processor may be configured to execute instructions to: determine whether each of the remote client's estimated network traffic is above a predetermined threshold; classify all remote clients with estimated network traffic above the predetermined threshold with the first classification; and classify all remote clients with estimated network traffic that is not above the predetermined threshold with the second classification.

In addition, the processor may be further configured to execute instructions to: aggregate the network traffic associated with each of the remote clients to create a network traffic total; select the remote clients in an order of descending network traffic; upon selecting each remote client, aggregate the network traffic for all selected remote clients; stop the selection of remote clients when the selected remote clients have an aggregated network traffic that is above a predetermined fraction of the network traffic total; classify all selected remote clients with the first classification; and classify all remote clients that have not been selected with the second classification. The instructions to allocate bandwidth may include providing bandwidth for remote clients having the first classification based, at least in part, on a weight value associated with the remote clients.

Still another aspect provides for a network device for running an application over a network, the network device comprising: a memory; and a processor coupled to the memory, the processor configured to execute instructions. Specifically the processor may execute instructions to receive a request for a shared-service application to run on behalf of a plurality of remote clients; estimate the network traffic associated with running the application for each remote client; transmit, to a second network device, the estimated network traffic; receive, for each remote client, and indication of whether the remote client is in a first classification or a second classification; enforce an individual bandwidth policy for each remote client in the first classification; and enforce a group bandwidth policy for all remote clients in the second classification. The instructions to enforce the individual bandwidth policy and the group bandwidth policy may include instructions to create a separate token bucket for each remote client in the first classification and create a single token bucket for all remote clients in the second classification. In addition the device may transmit, to the second network device, a weight value for each remote client, the weight value being related to a network criterion.

BRIEF DESCRIPTION OF THE DRAWINGS

FIGS. 8A-B illustrate computer systems for use in some implementations.

DETAILED DESCRIPTION

Aspects, features and advantages will be appreciated when considered with reference to the following description of exemplary implementations and accompanying figures. The same reference numbers in different drawings may identify the same or similar elements. Furthermore, the following description is not limiting; the scope is defined by the appended claims and equivalents.

Figure 1:
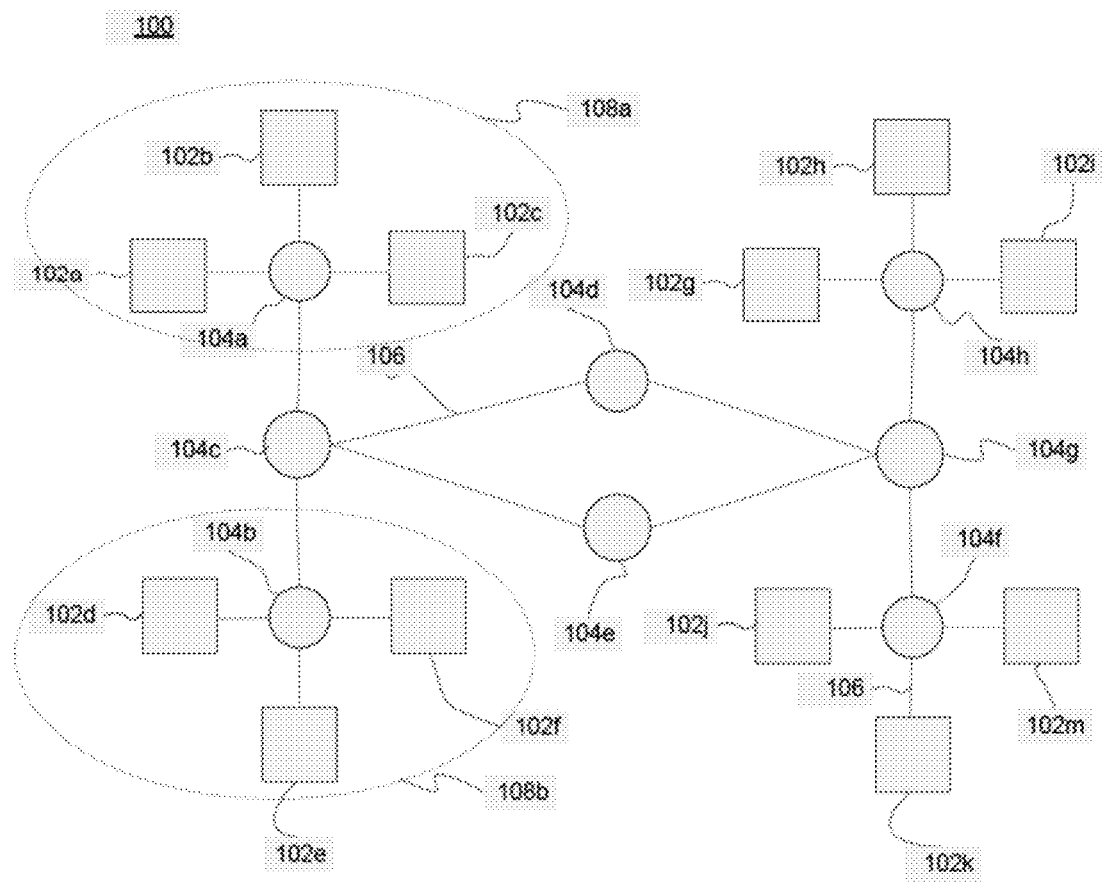
FIG. 1 illustrates an exemplary global network.

FIG. 1 illustrates an exemplary interconnection network 100 for use with some implementations. As shown, the network includes a number of hosts 102, which may be computers such as servers or client devices. The hosts 102 may be coupled to one another through nodes 104 in the network. The hosts 102 may also be coupled to external networks, storage systems, or other devices (not shown). Each node 104 may include a router having logical interfaces with other devices on the network via links 106. Each logical interface can be characterized as having a given capacity in bits per second.

The hosts 102 may be grouped into clusters that typically share computing resources with one another. In the example provided in FIG. 1, hosts 102a, 102b, and 102c are a network cluster 108a. Multiple clusters may operate at the same site or point of presence ("POP"). In FIG. 1, hosts 102a through 102c and hosts 102d through 102f represent two separate clusters, 108a and 108b respectively, that operate at the same POP. A network path is a sequence of logical interfaces from one point on the network to another, via links 106, while a "PathSet" is a set of multiple paths. PathSets can be used to describe all of the paths that can be taken for data that is transmitted between one network cluster to another. In addition, each path may have a relative weight, indicating the ratio in which network traffic should be split when transmitted along a PathSet having two or more separate paths.

Figure 2:
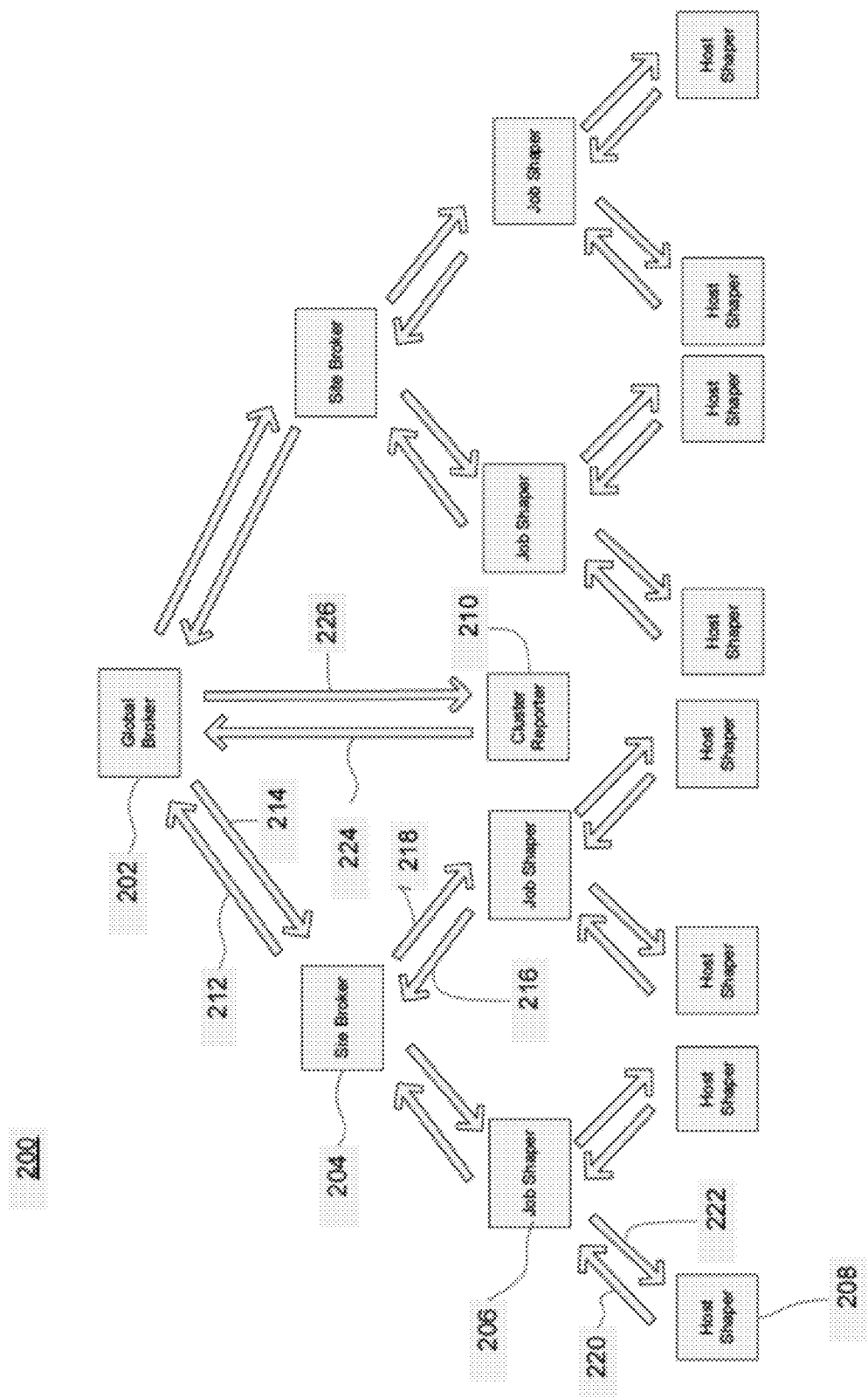
FIG. 2 illustrates a functional component hierarchy in accordance with some implementations.

One exemplary implementation is shown in the architecture 200 of FIG. 2. In this implementation, a system 200 includes the following components: a global broker 202, site brokers 204, job shapers 206, and host shapers 208. These components can be incorporated into the various hosts 102 of a large scale network, as shown in FIG. 1. The users of the network may include, applications (e.g., software programs), individuals, and client devices. In addition, one or more components of the architecture 200 may be incorporated into a single device on the network. For example, a site broker 204, job shaper 206, and host shaper 208 may comprise software modules that reside on a single device having a processor that is capable of performing the functions associated with each of the individual modules.

As shown in the architecture 200 of FIG. 2, the global broker 202 sits at the top of a bandwidth enforcer hierarchy. The global broker 202 is responsible for dividing up the available bandwidth on the network between different network clusters. The global broker 202 receives information relating to bandwidth usage and bandwidth demand from the site brokers 204. The network transmission information provided to the global broker 202 can be provided at a desired granularity. For example, instead of providing bandwidth usage and demand for each device on the network, the site brokers 204 can provide the global broker 202 with information relating to device clusters via data transmission route 212. For instance, the network data information provided to the global broker 202 may include an identification of each source cluster and destination cluster on the network.

The network transmission information may also designate each transmission with different priorities. For example, transmissions that are latency tolerant may be designated as low priority, while transmissions that are latency sensitive may be designated as high priority. In addition, a network transmission may be designated as either enforced or unenforced. Enforced data is subject to the bandwidth enforcement scheme, while unenforced data is exempt. Network transmissions might be designated as unenforced when they fall below a predetermined bandwidth threshold. The network transmission information may also include an indication of the transmission route that is taken. For example, if the network contains multiple backbones, the transmission information may indicate which backbone the transmission takes.

The network transmission information may be expressed in the form of principal components, or unique variables, that utilize each of the transmission designations provided above, thereby creating different "principals" depending on the variables that are being determined. For example, a "cluster principal" may be expressed by the following variables: <source cluster, destination cluster, transmission route, priority, enforced/unenforced>. Therefore, each cluster principal contains a unique combination of these five variables. As described below, other network "principals" can be created by creating combinations of different component variables.

For each separate cluster principal, the site broker 204 passes to the global broker 202 the bandwidth usage and a utility function that summarizes the bandwidth demand and provides the relative weight at which the demand is being requested by the users (data transmission route 212). The global broker 202 then implements the network sharing policies selected by the network administrators. The utility functions and network sharing policies are explained in detail below.

The global broker 202 may also be configured to maintain a network model that represents the current topology of the network. The network model, as well as the usage and demand information, may be used by the global broker 202 to detect congested links within the network. In turn, the global broker 202 may compute bandwidth limits for each cluster principal and divide up the available bandwidth between the various cluster pairs. In some instances, the global broker 202 passes down the bandwidth limits to the site broker 204 on a periodic basis (data transmission route 214). In one example, this may be on the order of every 10 seconds. In other examples, this exchange of information may occur at other regular or preset intervals, such as every 1-15 seconds, every 1-15 minutes, or upon a predetermined condition, which may be a network triggered event. This way, the system may provide bandwidth allocations based on current network demands.

Site brokers 204 desirably run at each network site or point of presence ("POP"). It is the site brokers 204 that receive, via transmission 214, the bandwidth limits from the global broker 202. The site brokers 204 also periodically distribute, via transmission 218, the bandwidth for each user and job among the job shapers 206. In some instances, this distribution occurs on the order of every 10 seconds. In other examples, this exchange of information may occur at other regular or preset intervals, such as every 1-15 seconds, every 1-15 minutes, or upon a predetermined condition, which may be a network triggered event.

Specifically, the site broker 204 receives, via transmission 214, the cluster principal bandwidth limits from the global broker 202 and divides the received bandwidth limits into user bandwidth limits in accordance with a user principal. The user principal comprises the identification of the user, the transmission's source cluster, the transmission's destination cluster, as well as the transmission's Differentiated Services Code Point ("DSCP"). It is the DSCP that contains the Quality of Service ("QoS") guarantees and related network preferences. In dividing a particular user's bandwidth among different jobs, the site broker 204 uses a job principal that is provided by the job shapers 206, via transmission 216. The job principal comprises the same variables as the user principal, but also may include the identification of a particular job that is being run by the network's user. Accordingly, the site broker 204 aggregates each of the job principals so as to create the user principal. The site broker 204 may then aggregate the user principal information into the form of a cluster principal and provide the cluster principal to the global broker 202, via transmission 212. In some instances, the site broker 204 provides the global broker 202 with usage reports that include the cluster principal demands, e.g., on the order of every 10 seconds. In other examples, this exchange of information may occur at other regular or preset intervals, such as every 1-15 seconds, every 1-15 minutes, or upon a predetermined condition, which may be a network triggered event.

The job shapers 206 run at each network cluster and are responsible for dividing up the job level bandwidth limits among tasks associated with those jobs and providing these limits to the host shapers 208, via transmission 222. In some instances, the job shapers 206 distribute the bandwidth limits on the order of every 5 seconds. In other examples, this exchange of information may occur at other regular or preset intervals, such as every 1-15 seconds, every 1-15 minutes, or upon a predetermined condition, which may be a network triggered event. The distribution is desirably work-conserving, in that any bandwidth not used by a task should be redistributed to other tasks. The job shapers 206 also periodically report job level bandwidth usage to the site brokers 204, via transmission 216. In some instances, these periodic bandwidth reports occur on the order of every 10 seconds. In other examples, this exchange of information may occur at other regular or preset intervals, such as every 1-15 seconds, every 1-15 minutes, or upon a predetermined condition, which may be a network triggered event. In performing this function, the job shapers 206 receive a task principal bandwidth usage and demand provided from the host shapers 208. The task principal contains the same variables as the job principal, but desirably also includes an identification of the each task that is implemented for a job. Accordingly, task principals may be configured to contain the following principal components: <user, job, task, source cluster, destination cluster, DSCP>.

Host shapers 208 may run on every host in the network, although this is not required. When a host device transmits data over the network, the transmission packets may be categorized by the individual processes, or tasks, that the host is running. The identification of each task may be performed by a kernel 840 (FIG. 8B), such as a Linux kernel, running on the host device. The kernel 840 thereby allows the system to map each network connection, such as TCP connection, of the host device to a corresponding task and user. It is the host shapers 208 that periodically report this task usage information to the job shapers 206, via transmission 220, and it is the host shapers 208 that enforce the bandwidth limits provided by the job shapers 206, via transmission 222, on the individual hosts. The periodic task usage reports can occur on the order of every five seconds. In other examples, this exchange of information may occur at other regular or preset intervals, such as every 1-15 seconds, every 1-15 minutes, or upon a predetermined condition, which may be a network triggered event. Each task transmitted on the network is classified at a particular host based on the identification of the remote cluster with which the transmission is occurring, the end user, as well as the DSCP of that transmission. For each remote cluster and DSCP pair, the bandwidth usage is measured and throttled using a token bucket algorithm.

Each host shaper 208 may be configured to perform numerous functions. For example, the host shaper 208 can manage a map of the network cluster names to their Internet Protocol ("IP") subnets. Each host shaper 208 can also run periodic checks for new inter-cluster traffic on the network and, in turn, create new traffic-control classes. The tree of traffic control classes can then be divided and managed by the host shaper 208. Divisions of the traffic control classes can be made based on the following principal components: <local task, remote cluster, DSCP>. The host shaper 208 may also be configured to perform other traffic optimization functions, such as creating a fast path for particular intra-cluster network traffic and to prioritize upstream acknowledgements of response ("ACK's").

In addition, the host shaper can perform throughput threshold checks at each host and create token buckets for network transmissions. A token bucket is a control mechanism that determines when traffic can be transmitted, based on the presence of tokens in an abstract bucket. The bucket contains tokens, each of which can represent a unit of bytes or a single packet of predetermined size. A network administrator may specify how many tokens are needed to transmit a particular number of bytes. When tokens are present, a flow is allowed to transmit traffic. If there are no tokens in the bucket, a flow is not allowed and packets are not transmitted. Other known mechanisms for determining when traffic is to be transmitted may alternatively be used. In response to input from an upstream job shaper 206, the host shaper 208 may also update the limits on the token buckets. Token buckets that have become inactive can be discarded. In one example, each token bucket can be configured to allow an average bit-rate R with a burst-size of B seconds. At any given rate R and burst B, a period of inactivity B triggers the traffic to be allowed to burst at line-rate, or data transmission speed, equal to a total volume of R*B bits and a sustained rate of R can be achieved in absence of idleness.

Bandwidth throttling can occur in any number of existing ways. For example, in-kernel throttling can be implemented using a Linux HTB packet scheduler and packet classifiers. It should be noted that for TCP, it is possible to always throttle the bandwidth on the client side of the transmission. However, such a process may require large client side buffering when a network client is pulling a large amount of data. Accordingly, the bandwidth can be throttled on the side of the network that is sending the data.

The bandwidth enforcer system may also include a network model cluster reporter ("cluster reporter") module 210 that may run in each network cluster and perform traceroute operations to some or all other clusters on the network. The cluster reporter 210 aggregates the traceroute data and reports it to the global broker 202, via transmission 224. In return, the cluster reporter 210 receives from the global broker 202, via transmission 226, a list of all known clusters on the network. The cluster reporter 210 can also be configured to periodically send traceroute commands to the job shapers 206.

The system 200 is configured to enforce the desired bandwidth allocation policies of the network using, in part, the processes described below. The configurations to enforce the bandwidth allocation policy can include one or more components, such as the following: user weights; manual throttles, permanent allocations, auto-enforcement rules, auto-enforcement thresholds, network model overrides, and cluster lists. A user weight is a numerical value that determines the proportion of bandwidth that a user receives from the bandwidth enforcer 200. The user weight can depend on the QoS level for a particular transmission. Accordingly, for each transmission a default user weight and a QoS multiplier is used. The QoS multiplier is a value that sets the quality of service level for the particular types of data transmissions. Accordingly, in one example, the user weight for a given transmission is the default user weight multiplied by the QoS multiplier:

$$user\_weight = default\_user\_weight * QoS\_multiplier$$

For example, suppose user A and user B are both performing data transmission on the network that has been assigned a QoS multiplier of 100. If user A has default user weight of 1, and user B has a default user weight of 1.5, user A's transmission is assigned an actual user weight of (1.0*100)=100, while user B's transmission is assigned an actual user weight of (1.5*100)=150. The value of the user weight multiplier or QoS multiplier may depend on any set of factors relevant to determining the importance of a particular network user. For example, users that are working on critical projects, or time sensitive projects, that require large amounts of data may be provided with higher user weight multipliers and higher QoS multipliers than users working on less important projects. It should be noted that the user weight can act as a default setting that can be overridden for specific users, if desired. For example, if a user determines that he or she is not receiving sufficient bandwidth, the user may submit a request for additional bandwidth. This request may be made through the user's network device, and the request may be sent from the device's host shaper 208 to the global broker 202. Dependent on current network usage, or input from network administrators, the global broker 202 may then override the default user weight setting, thereby providing additional bandwidth to the user.

Another configuration component used by the bandwidth enforcer system 200 is a permanent allocation ("PA"). PA's can be used to reserve bandwidth on the network for important user transfers. Accordingly, PA's may be given the highest priority in the system's allocation policy. The system can designate a PA reservation based on the principal components of user, source cluster, destination cluster, and QoS value. For example, the global broker 202, can be configured so that 2 Gbps of bandwidth are reserved for user A, provided that user A attempts to send data from Cluster B to Cluster C using a QoS above a predefined threshold. When user A is not using this reserved bandwidth, it can be temporarily allocated to other users.

Another system configuration component is the manual throttle, which specifies a maximum limit on the rate at which a user can send between two network clusters. The Manual Throttle can be designated at the job level ("job throttle") or at the user level ("user Throttle"). The user Throttle contains the same principal components as the PA, namely user, source cluster, destination cluster, and QoS level. The Job Throttle uses the same principal components with the addition of a fifth principal component designating a job that is being run by the user.

Yet another configuration component used by the system is an automatic enforcement rule, designating which network transmission flows are to be enforced, and which are to be left unenforced. Each automatic enforcement rule can specify any number of network parameters for exemption from bandwidth enforcement, such as specified transmission paths. The network parameters can include designation of source clusters, destination clusters, users, jobs, or the like, as well as any combination thereof. Likewise, the Automatic Enforcement Rules can designate other network parameters for automatic inclusion in the bandwidth enforcer's allocation policy. In addition, the bandwidth enforcer may implement Auto Enforcement Thresholds that specify the bandwidth usage rate required before a transmission is subject to the bandwidth enforcer's allocation policy. This threshold can be enforced on the job principal level. For example, an Auto Enforcement Threshold can be set for 5 Mbps, so that each job principal is not subject to the bandwidth enforcer's allocation policy unless it has a usage rate above the 5 Mbps threshold. In some instances, the bandwidth enforcer places each job principal that meets the threshold into an auto-enforced bucket, and it keeps the job principal in the auto-enforced bucket for a predetermined period of time, such as fifteen minutes. In other examples, the period may occur at other regular or preset intervals, such as every minute to every hour, or upon a predetermined condition, which may be a network triggered event. This way, network transmissions that intermittently move above and below the threshold do not flip back and forth between an enforced state and an unenforced state. The Auto Enforcement Thresholds can also be set for different threshold levels depending on the transmission route. For example, if the network contains two or more backbones, the bandwidth enforcer can set the threshold of the first backbone to 5 Mbps, while the threshold level for the other backbone(s) can be set to 10 Mbps.

Network model overrides are another configuration component of the bandwidth enforcer system 200. Network model overrides allow for manual overrides for a given link capacity and reservable threshold. The overrides can be expressed as a set of rules contained in an ordered list, with the first matching rule in the list being applied. Separate ordered lists are used for link capacity overrides and reservable threshold overrides. Each link can be specified in the set of rules by identification of the link's source router, destination router, and the interface that is used.

The clusters that are present on the network can be identified on a cluster list. For each cluster, the list can contain the name of the cluster, the site or POP to which it belongs, as well as the subnet in which the cluster exists.

If two users on a network have the same user weights, the bandwidth enforcer system 200 allocates the same amount of bandwidth, provided that they are sending transmissions having the same QoS from the same source cluster to the same destination cluster. This is not necessarily the case in instances where users are sending transmissions between different cluster pairs. However, it should be appreciated that the bandwidth enforcer system 200 may be configured so as to provide fairness among network users regardless of whether they are transmitting between distinct sources and destinations. In addition, the bandwidth enforcer 200 can be configured to allow a user to lend its user weight value, via a priority token, to another user flow so that the other flow can operate at the original user's priority.

As described above, the bandwidth enforcer system 200 aggregates inter-cluster network usage information from all user devices on the network. This usage information can be extrapolated so as to project or predict bandwidth demands on the network. The bandwidth enforcer can then allocate bandwidth among user devices by incorporating the extrapolated usage information into various bandwidth sharing processes.

The bandwidth enforcer system may implement what can be described as a "waterfill" process, which divides the network's available bandwidth between competing users, jobs, and tasks. For the purposes of the waterfill process, each job principal can be associated with a particular user principal. Accordingly, the job principal can be considered to be a child principal of an associated, parent user principal. Similarly, each task principal can be associated with a job principal and can be considered to be the child principal of that job principal.

Figure 3:
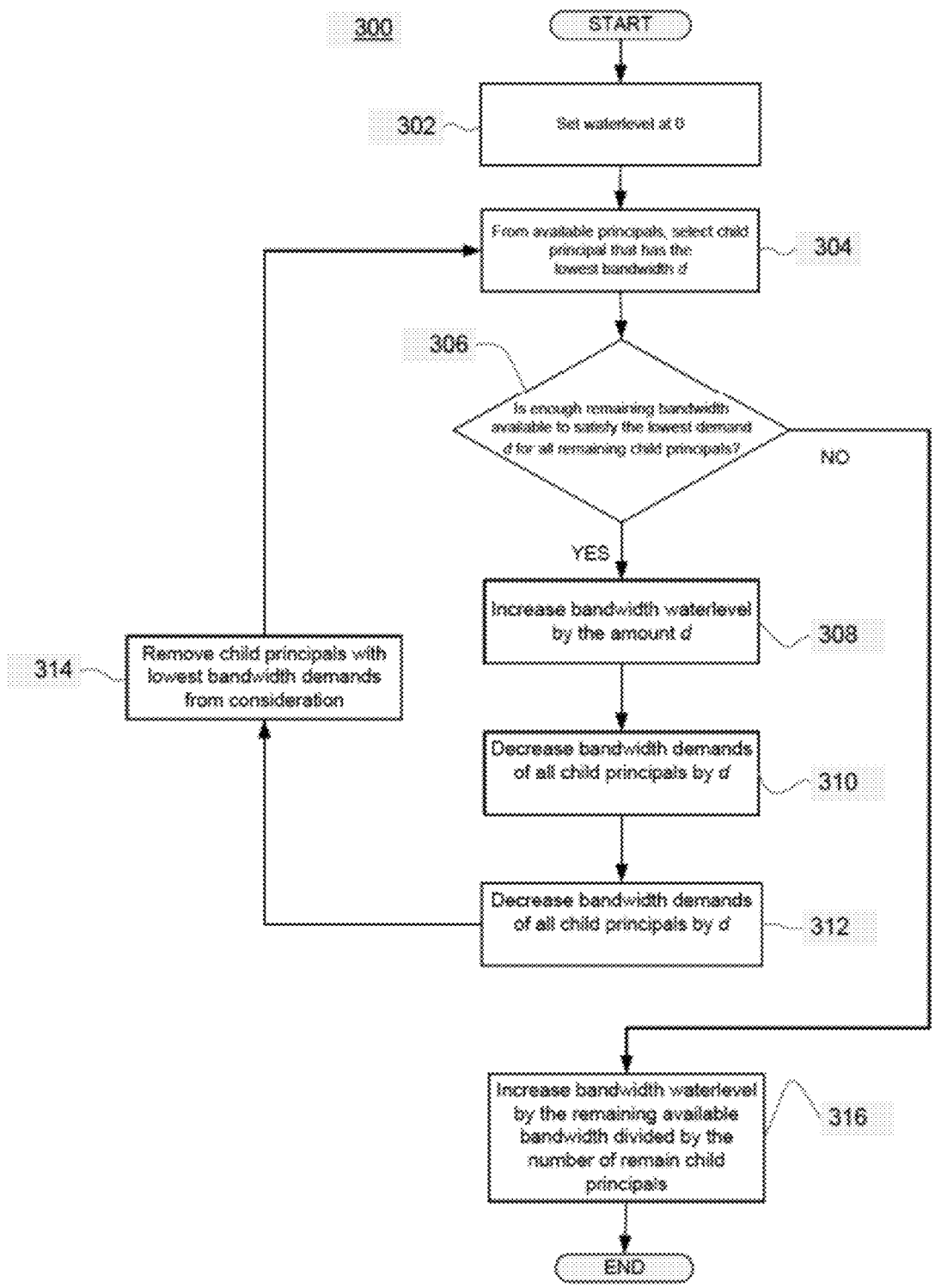
FIG. 3 is a flow diagram in accordance with some implementations.

The waterfill process 300 is illustrated in the flow diagram of FIG. 3. The waterfill process 300 may be performed by any module on the system, such as by the site broker 204 or the job shaper 206. The process begins at block 302, with the original bandwidth water level being set at 0. In block 304, the bandwidth enforcer module selects from the available principals, the child principal that has the lowest bandwidth demand d. In block 306, it is determined whether enough remaining bandwidth is available to satisfy the lowest demand for all remaining child principals. If the answer to block 306 is "yes", the process proceeds to block 308, wherein the bandwidth water level is increased by the amount d. Then, in block 310, the bandwidth demands of all children are decreased by the amount d. In block 312, the available bandwidth is decreased by (d*number of remaining child principals). Then, in block 314, the lowest demand child principal previously selected in block 304 is removed from future consideration, and the process returns back to block 304. If the answer to block 306 is "No", the process proceeds to block 316, wherein the water level is increased by the remaining bandwidth divided by the number of remaining children. Upon completing the waterfill process 300, the bandwidth limit for all principals that satisfied block 306 is equal to the demand for that principal. For all other principals, the limit is equal to the water level as set by the last iteration of block 308. In this way, the waterfill process divides the available bandwidth between all competing principals in a max-min fair manner, meaning that the minimum data rate that a dataflow achieves is maximized.

The site brokers 204 can summarize bandwidth demands for network users by creating a utility function. More specifically, a single utility function can act as a representation of the bandwidth demand of multiple users that are sending data between the same pair of network clusters. The utility function can also take into account the user weights and the PA's granted to each user, as described above.

Figure 4:
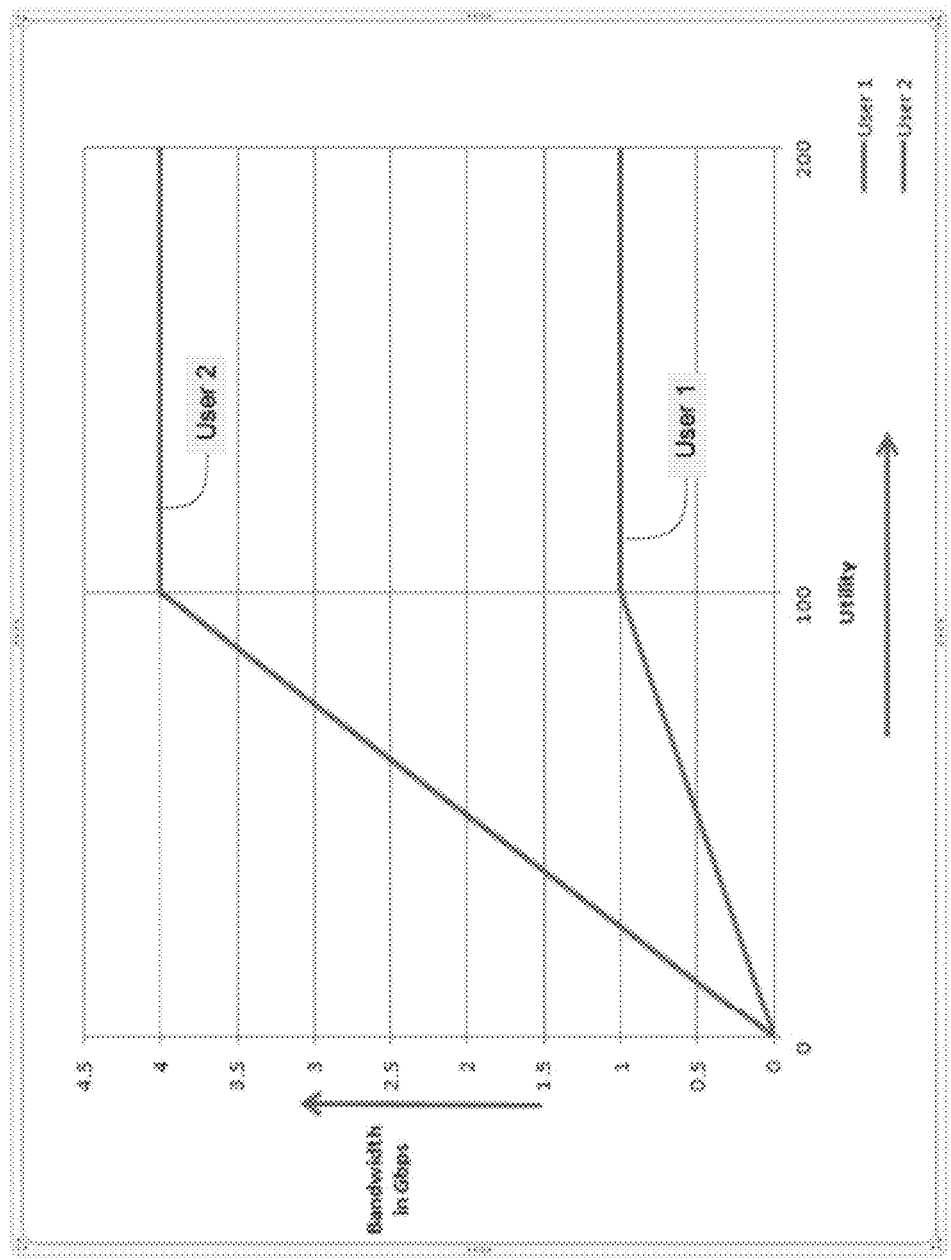
FIG. 4 is a graph demonstrating bandwidth allocation in relation to a utility value.

FIG. 4 illustrates the utility functions for two users, user 1 and user 2, each of whom has a different PA. In this example, user 1 has been assigned a PA of 1 Gbps, while user 2 has been assigned a PA of 4 Gbps. The scale of the utility values provided in FIG. 4 can be arbitrarily set, as it is only their relative values that are determinative. For the purpose of this example, the utility functions run between values of 0 and 200. Given that PA's are designated with the highest priority during bandwidth sharing, the utility function reserves utility values between 0 and 100 solely for PA's. The rest of the user demands are summarized in the utility space between 100 and 200. As shown in FIG. 4, both PA's are completely satisfied at a utility of 100 and above. For a utility value of less than 100, each user is granted a bandwidth in proportion to their PA's.

Figure 5:
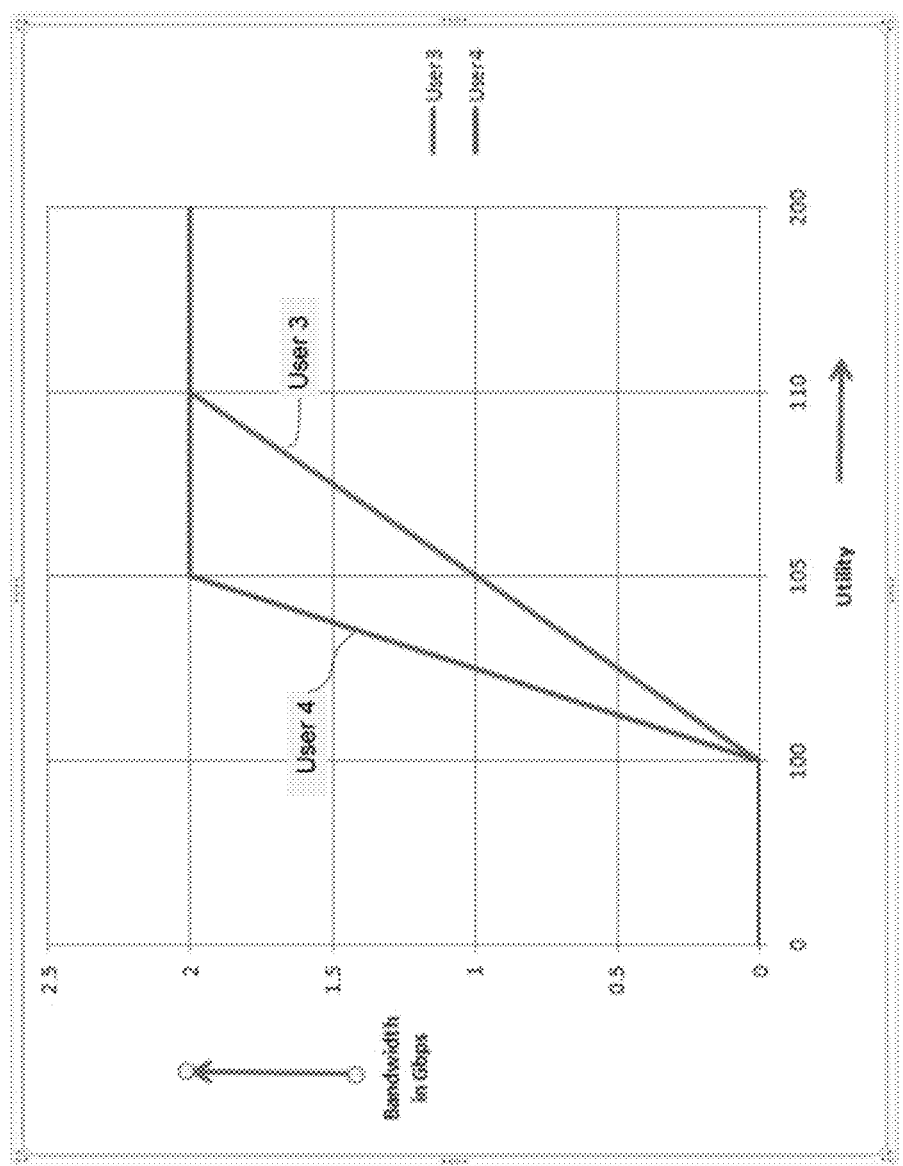
FIG. 5 is a graph demonstrating bandwidth allocation for users with different weight values in relation to a utility value.

For user demand beyond the user's granted PA, bandwidth is allocated in proportion to user weights. FIG. 5 illustrates the utility functions for two users who are each are requesting 2 Gbps of bandwidth. In this example, the two users have not been assigned any PA, therefore they have no bandwidth granted to them for utility values of 100 and below. However, for utility values over 100, the system has been configured to assign user 4 a weight of 0.4, while user 3 has been assigned a lower user weight of 0.2. Accordingly, user 4's demands are granted at a lower utility value than the demands of user 3.

Figure 6:
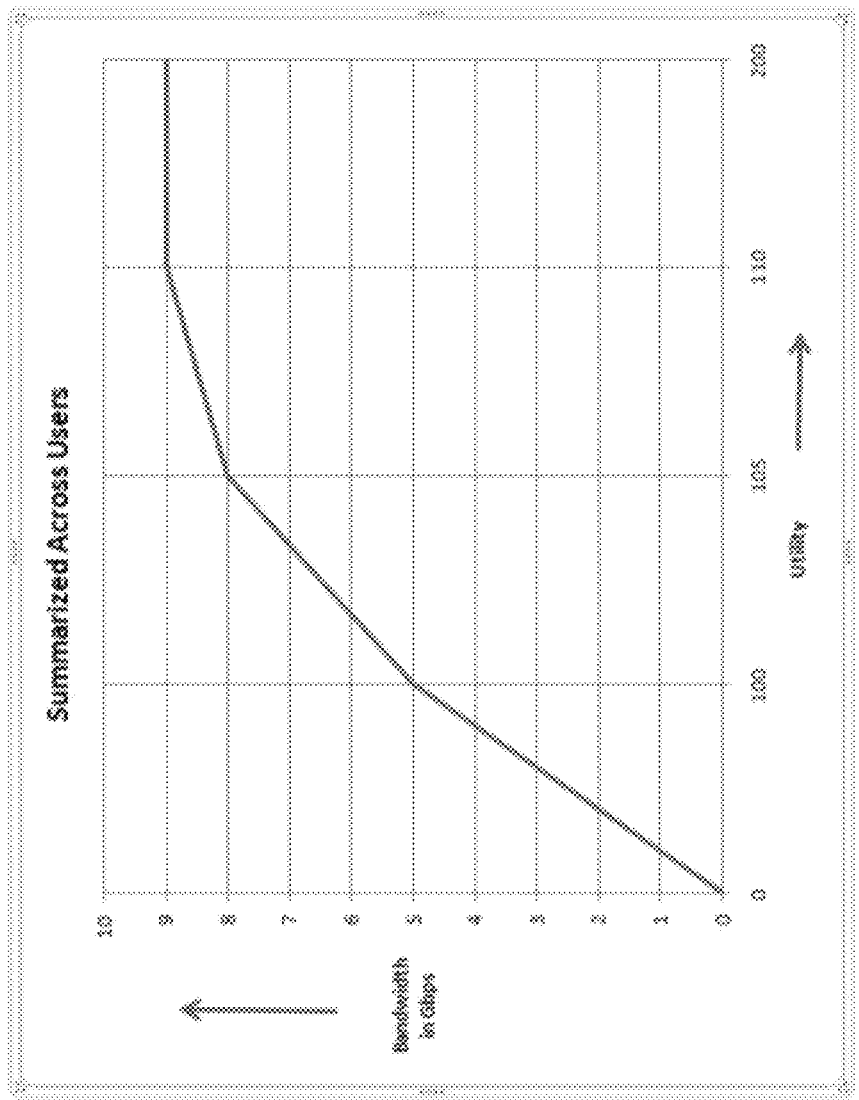
FIG. 6 is a graph demonstrating a summarized bandwidth allocation in relation to a utility value.

The site brokers 204 can create utility functions for the bandwidth demand of each user principal. It can then summarize the user principal demands for the same cluster pair into a single utility function, called a summarized utility function. FIG. 6 illustrates a summarized utility function for user 1, user 2, user 3, and user 4. As shown in FIG. 6, the summarized utility function is simply a linear addition of the bandwidth demands for each user's individual utility functions, as provided in FIGS. 4 and 5.

Figure 7:
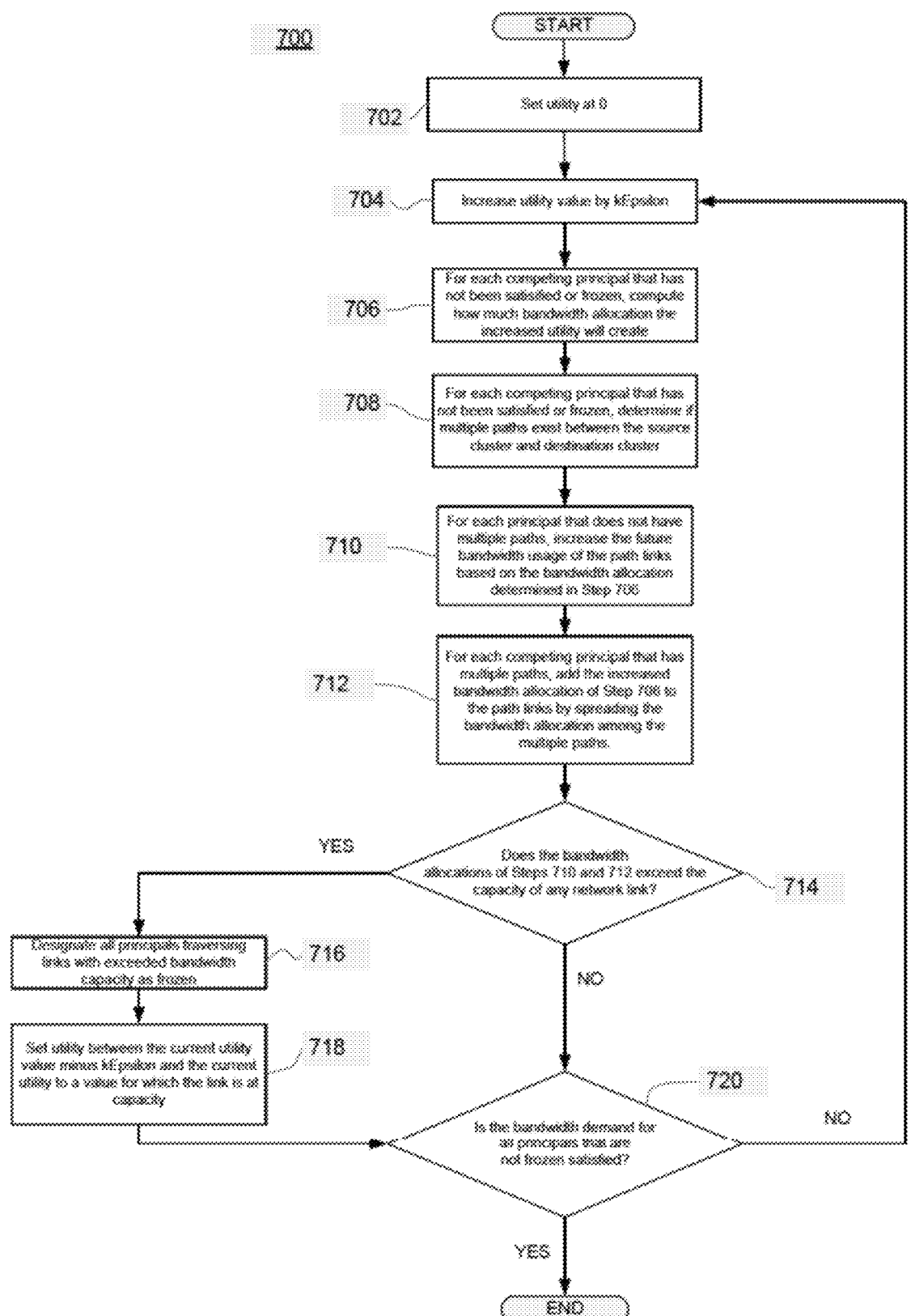
FIG. 7 is a flow diagram in accordance with some implementations.

The system may determine how to divide available network bandwidth between competing principals by implementing a progressive filling process that incorporates the utility functions of the network users. An exemplary progressive filling process 700 is illustrated in FIG. 7. Beginning at block 702, the initial utility is set to the value 0. In block 704, the utility value is increased by an amount kEpsilon. For each competing principal that has not been satisfied or frozen, the utility function of the principal is used to compute how much bandwidth allocation the increased utility creates (block 706). Then, the process determines if there are multiple paths between each source cluster and destination cluster identified in the competing principals (block 708). If there is only a single path, the future bandwidth usage of the path's links is increased at block 710 based on the bandwidth allocation determined in block 706. If multiple paths between the source cluster and destination cluster exist, the increased bandwidth allocation of block 706 is added to the network links by spreading the bandwidth allocation among the multiple paths (block 712). It should be noted that each path can be weighted by different multiplication factors, so if multiple paths exist, the allocation among each path is in proportion to the path's relative weight. In block 714, the process determines if the bandwidth allocations of blocks 710 and 712 exceed the capacity of any network links. If there are no links that exceed capacity, the process proceeds to block 720. If the capacity of a network link is exceeded, that link is designated as a bottleneck and all principals that traverse the bottleneck link are frozen, meaning that they cannot be allocated any more bandwidth (block 716). A binary search is then performed between the current utility value ("CUV") minus kEpsilon (CUV−kEpislon) and the current utility value (CUV) to determine the utility value for which the link capacity is not exceeded (block 718). The process, starting at block 704, is repeated until all of the principals are either frozen or have had their bandwidth demand satisfied (block 720).

In many instances, the network transmits data that is exempt from management by the bandwidth enforcer system. In allocating bandwidth between competing cluster principals, the global broker 202 adjusts for the available capacities of the logical interfaces for all such unmanaged traffic. For example, assume that a logical interface has 10 Gbps in available capacity, and that the current utilization is 8 Gbps. If only 5 Gbps of the utilization is manageable, the global broker subtracts the other 3 Gbps from the available bandwidth, thereby creating an effective capacity of 7 Gbps for that logical interface.

Once the unmanaged bandwidth is accounted for, the progressive filling process can be used to allocate bandwidth among the competing cluster principals. In performing this process, the site broker 204 passes to the global broker 202, the utility functions that contain the summarized demand for each cluster principal. These utility functions are computed by the site broker 204 from the utility functions for each individual user principal at that cluster. The system may be configured to provide manual throttles for some user principals. For these user principals, the site broker 204 can cap the bandwidth demand by the throttle value, meaning that those principals cannot be allocated for more bandwidth than the configured throttle value. If bandwidth is still available after running the progressive fill process, the remaining bandwidth can be divided up among the user principals as a bonus bandwidth. Given that some of the user principals do not use the assigned bonus, the bonus bandwidth can be over-subscribed by a configurable scaling factor. For example, each user may be assigned a scaling factor between one and ten, and the bonus bandwidth may be allocated in proportion to the scaling factor.

As previously described, the global broker 202 provides site brokers 204 with the bandwidth limit for each cluster principal. The site brokers 204 can then look up the summarized utility function for each cluster principal and determine the utility value corresponding to the assigned bandwidth limit. This utility value can be referred to as the master rate, and can be used to look up the bandwidth limit for each user principal in the user principal utility function. If the global broker 202 has assigned a bonus bandwidth to the cluster principal, this bonus bandwidth can be divided up among the user principals.

In order to construct the utility function for a user principal, the site broker 204 determines what the bandwidth demand is for that user principal. This may be done by selecting the peak user principal bandwidth usage over a recent period, such as the last two minutes. In order to assure adequate bandwidth allocation, the site broker may multiply the user principal's peak usage by a predetermined scaling factor, such as 1.1, to create a slightly higher peak user principal demand. In other alternatives, this peak usage scaling factor may run between 1 and 1.5. For some users, the bandwidth enforcer system 200 may be configured to provide a manual throttle. For these users, the bandwidth demand is capped by the throttle value. In addition, these users are not assigned bonus bandwidth beyond the throttle value. This way, the bandwidth allocated to these users does not exceed the configured throttle settings.

The site broker 204 can then divide the bandwidth limit assigned to a user principal among its constituent job principals by implementing the waterfill process on the various job principals. If any bandwidth is still remaining after the waterfill process is performed, it can be divided among the job principals as bonus bandwidth. As above, given that some of the job principals do not use the assigned bonus, the bonus bandwidth can be over-subscribed by a configurable scaling factor. For example, each job may be assigned a scaling factor between one and ten, and the bonus bandwidth may be allocated in proportion to the scaling factor.

In determining the bandwidth demand to be used in the waterfill process, for each job, the site broker 204 may use the peak demand that has occurred over a recent period of time, such as two minutes. In other examples, the period for determining peak demand may be set at other intervals, such as 1-15 minutes, or upon a predetermined condition, which may be a network triggered event. Given that different jobs peak at different times, the system can scale up the total bandwidth limit for the user principal. The scaling factor being equal to the sum of the peak job principal demands divided by the Peak user principal demand. For some jobs, the system may have a configured manual throttle. In this instance, the demand at the waterfill process is capped by the throttle value. Similarly, these jobs are not assigned bonus bandwidth beyond the throttle value.

Once the site broker 204 has assigned bandwidth limits to the job principals, the job shapers 206 can then divide the assigned job principal bandwidth among the constituent Task Principals. This function is performed by implementing a modified version of the waterfill process 30 on the various Task Principals. Given that tasks for a job are bursty and that different tasks can burst at different times, the same bandwidth limit is assigned to each task. This limit is equal to the water level when the process is terminated. In determining the bandwidth demand to be used in the waterfill process 30, for each task, the site broker 204 can use the peak demand that has occurred over a recent period of time, such as two minutes. Given that different tasks peak at different times, the system may scale up the total bandwidth limit for the job principal. The scaling factor being equal to the sum of the peak Task Principal demands divided by the Peak job principal demand.

The system may be configured to prevent a sudden burst of traffic during periods of bandwidth ramp up triggered by the bandwidth enforcer 200. For example, a gradual ramp up of increased bandwidth allocation can be implemented for different tasks so as to prevent any synchronous bursts. In addition, the system may be configured so that network users can know if their job is being throttled by the system. Accordingly, a view can be made available for every network flow, identified by the user, source cluster, destination cluster, and QoS. This view can be made at the link level along the transmission's path. The system may also be configured so as to allow users to dedicate more of its resource quota to important jobs or tasks and leave fewer resources for less important jobs or tasks. This can be performed by allowing users to assign weight values to individual jobs and tasks.

The system may also contain redundant components so as to allow for continued operation, even if a particular component is malfunctioning or unreachable. For example, the system may contain multiple global brokers 202 running in different portions of the network. At any given time, only one global broker 202 is designated as "live". The site brokers 204 may report information to, and receive information from, every global broker 202 in the network. However, the site brokers 204 only accept the bandwidth limits that are provided by the live global broker 202. Redundancies may also be implemented for the site brokers 204 and the job shapers 206.

Figure 8A:
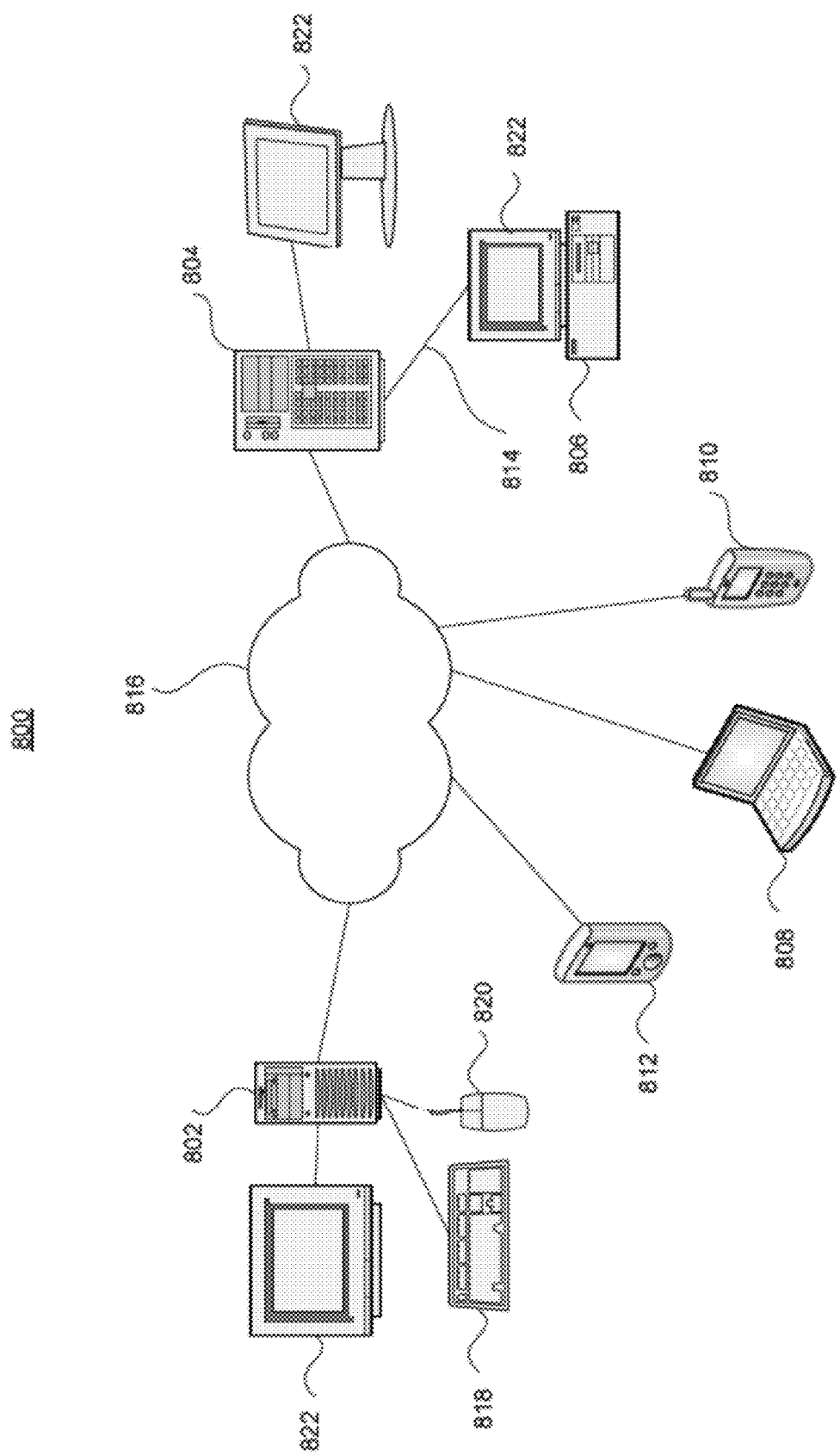

The system may be implemented with the following exemplary computer system. FIG. 8A presents a schematic diagram of a computer system depicting various computing devices that can be used alone or in a networked configuration. For example, this figure illustrates a computer network 800 having a plurality of computers 802, 804, 806 and 808 as well as other types of devices such as portable electronic devices such as a mobile phone 810 and a PDA 812. However, the system is not so limited, and other devices, including netbooks and pad-type handheld computers (not shown), may also be used. Such devices may be interconnected via a local or direct connection 814 and/or may be coupled via a communications network 816 such as a LAN, WAN, the Internet, etc., and which may be wired or wireless.

Each device may include, for example, one or more processing devices and have user inputs such as a keyboard 318 and mouse 820 and/or various other types of input devices such as pen-inputs, joysticks, buttons, touch screens, etc., as well as a display 822, which could include, for instance, a CRT, LCD, plasma screen monitor, TV, projector, etc. Each computer 802, 804, 806 and 808 may be a personal computer, server, etc. By way of example only, computers 802 and 806 may be personal computers while computer 804 may be a server and computer 808 may be a laptop.

As shown in FIG. 8B, each computer such as computers 802 and 804 contains a processor 824, memory/storage 826 and other components typically present in a computer. For instance, memory/storage 826 stores information accessible by processor 324, including instructions 828 that may be executed by the processor 824 and data 830 that may be retrieved, manipulated or stored by the processor. The instructions 328 at the server may include operations associated with one or more of the modules in the current system, such as the global broker 202 or site broker 204. The instructions 828 at the client device 802 may include operations associated with one or more of the modules, such as the job shaper 206 and host shaper 208.

In one implementation, the instructions 828 of client device 802 may include programs that may be implemented on client device 802 as applications. In addition, instructions 838 of server 804 may also include programs that run as applications on the network 816. These applications may be classified as either "dedicated applications" or "shared-service applications". A dedicated application is one that is identified by the bandwidth enforcer 200 as being (or being associated with) a particular user. A shared-service application is one that runs with its own identity, but is actually performing work on behalf of a dedicated application. For example, an application to display web photo albums may run backend servers that perform image rendering or manipulations. The photo album application may also implement a storage application to store the photos on a server. The web photo application runs independently on a client device, and does not run on behalf of another application. Accordingly, the web photo application is a dedicated application. Conversely, the storage application runs on behalf of the web photo application and may also run on behalf of other applications, such as E-mail or backup programs. Therefore the storage application is classified as a shared-service application.

The both shared-service applications and dedicated application may run simultaneously on the network 816, with each requiring network bandwidth. Bandwidth enforcer 200 must therefore allocate bandwidth between both shared-service and dedicated application. In this instance, bandwidth enforcer 200 may allocate bandwidth for shared-service applications by determining on which user's behalf the shared-service is running, and allocating bandwidth for the shared-service in accordance with the user's bandwidth allocation.

For example, Host system 802 shown in FIG. 8B may simultaneously run several applications 829. As described above, the host system 802 may transmit data over the network via transmission packets that are categorized by the individual processes, or tasks, that the host is running. The identification of each task may be performed by kernel 840, running on the host device. Kernel 840 thereby allows the system to map each network connection, such as TCP connection, of the host device to a corresponding task and user. Specifically, a host agent, such as host shaper 208, classifies a transmission packet with a unique "process-id" that indicates the network connection and application that generated the transmission. In addition, the host agent classifies the transmission packet with a "client-id" that identifies the particular user running the application. Using the client-id, the bandwidth enforcer can identify which user is associated with a shared-service application.

To facilitate classification of transmission packets with a client-id, applications 829 may link to a library 831 contains a list of client-id's and their corresponding users. Specifically, an application 829 provides the library 831 with the user, as well as the corresponding network connections, that are running the application. This information is then stored in connection with a particular client-id.

When an application 829 begins to run on a network device, the host shaper 208 may create a queue to capture all of the transmissions being sent by the application 829. Once the queue is created, the transmissions may be sub-classified in accordance with each transmission QoS value. Each QoS queue may then be sub-classified again into separate queues corresponding to the different IP address ranges and subnets within that range that are receiving the application's transmission (a "remote-subnet"). In other words, the remote-subnet may represent a network cluster containing the remote-hosts receiving the network traffic from application. Accordingly, the host shaper 208 creates separate queues for each unique combination of the principal components: <application, remote-subnet, QoS>. If the application is a shared-service, the host shaper 208 further sub-classifies the transmission queues based on the client-id of the user that is running the application. Accordingly, there are separate transmission queues for each unique combination of <application, remote-client-id, remote-subnet, QoS>. The bandwidth enforcer 200 may then control the traffic of the applications 829 by allocating a specific amount of bandwidth for each queue. For example, the host shaper 208 may create a separate token bucket 833 for each unique combination of <application, remote-client-id, remote-subnet, QoS> involved in data transmission over the network. Once the token buckets 833 are created, the bandwidth enforcer 200 may perform the waterfill process and progressive filling process in connection with data packets in each token bucket, as described above. By creating token buckets for only the actively transmitting queues, the memory used for the queuing process is minimized, and the kernel data structures created for tracking the transmission may be allocated from the memory nodes designating that particular application.

As provided above, host shaper 208 reports the network traffic (e.g., application transmission packets) being sent over the network to a central server, such as global broker 202. In the case of a shared-service application, the host shaper 208 needs to identify the device that is running the application (local-host), as well as the identity of the device on whose behalf the application is running (remote-client-id). Accordingly, the host shaper 208 identifies the following components for each shared-service data transmission: <local-host, application, remote-client-id, remote-subnet, QoS>. In some instances, an application runs on more than one host device. Accordingly, the host shaper may provide the data transmissions, but identifying the data transmission based on the components <application, remote-subnet, QoS> as the "primary" components, with each unique combination of parent components containing "secondary" components identifying each unique combination of <local-host, remote-client-id> that is performing the work.

A shared-service application 829 running on host system 802 may be running on behalf of numerous client devices, including remote client 808 and remote client 810. Some of the remote clients may be considered "large", in that they require the shared-service application to send large amounts of data over the network 816. Other remote clients may be considered small, in that they require only a small amount of data traffic from the shared-service. In order to efficiently allocate bandwidth over the network, the bandwidth enforcer 200 may administer a bandwidth policy that individually allocates bandwidth for each large client, but allocates bandwidth to the small clients as one group. In particular, the bandwidth enforcer 200 may place data transmissions for each large client into individual token buckets 833, while creating one token bucket (the "small token bucket") for all small remote clients. In order to determine whether a shared-service for a particular remote client is large or small, the shared-service application 829 sends to the host shaper 208 an estimate of the number of bytes that are involved in the application's data transmission. This may occur when the shared-service application 829 requests a client-id from the host shaper 208. The estimate is then sent by the host shaper 208 to the global broker 202. In turn, the job shaper 206 classifies the remote client's traffic as being either large or small. Upon making this determination, the job shaper 206 sends a command to the host shaper 208 to either track the remote client's transmissions individually or to place the transmission into the small token bucket.

In addition to classifying traffic as being large or small, the bandwidth enforcer may alternatively classify traffic based on the identity of the traffic's user. For example, the job shaper 206 may assign a particular user's network traffic to an individual token bucket. In another alternative, the top "T" users of bandwidth between two network endpoints may be assigned individual token buckets, while all other traffic is included in a single token bucket. The number T is a predetermined number that varies based on the number of network users, the likely bandwidth used by particular users, and the particular priority given to some users' network traffic.

Figure 9:
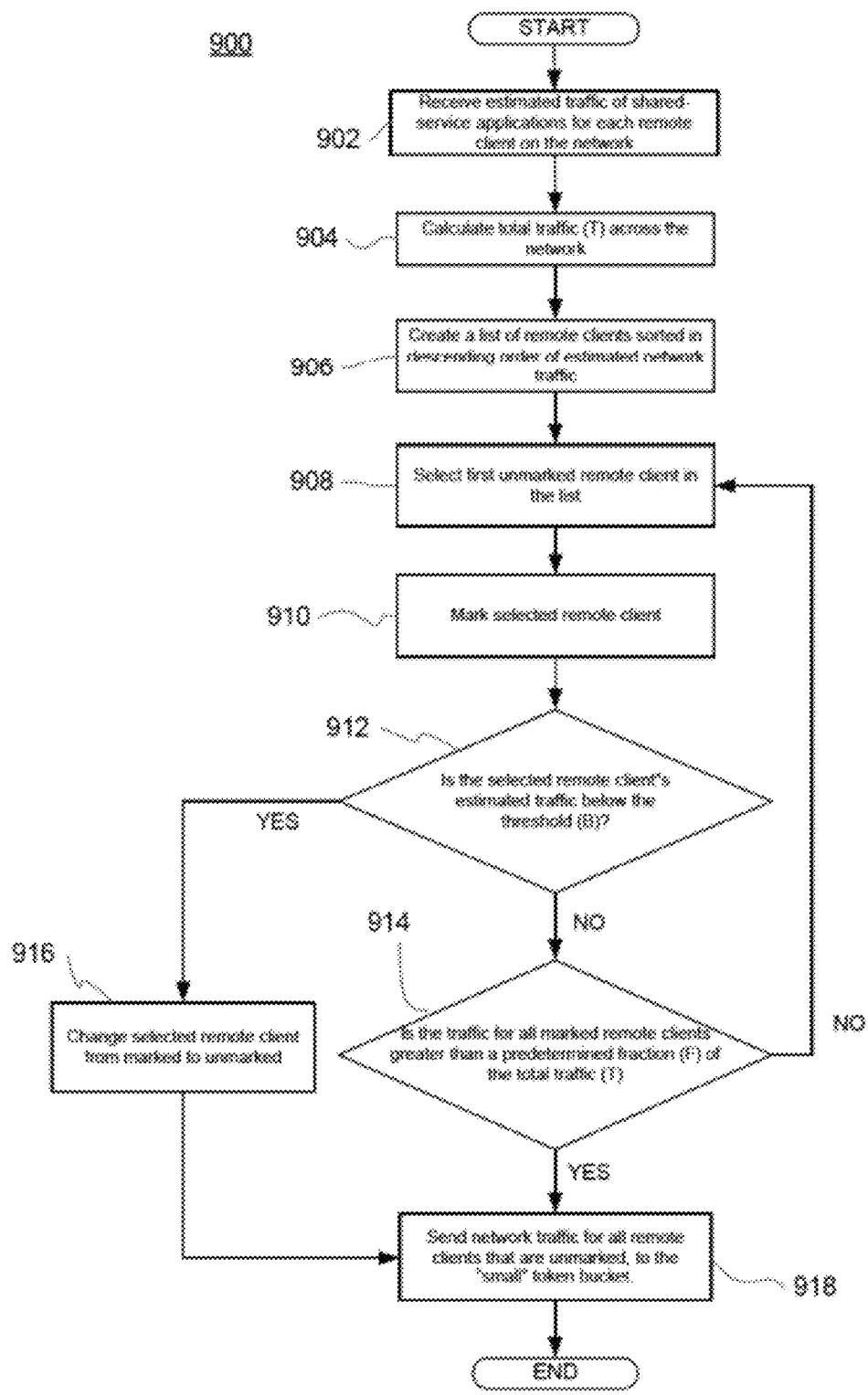
FIG. 9 is a flow diagram in accordance with some implementations.

FIG. 9 is a flow diagram that illustrates process 900 by which the job shaper 206 classifies the remote client's traffic as large or small. First, the global broker receives, from the host shapers 208, the estimate of the number of bytes that are involved for the shared-service applications of each remote client on the network (block 902). The job shaper 206 then adds the reported estimates to calculate the total estimated amount of traffic (T) across the network (block 904). In block 906, the job shaper 206 creates a list of remote clients. The remote clients are listed in descending order based on their estimated network traffic. The job shaper 206 then iterates through the list of remote clients by selecting the first remote client in the list (block 908). Upon selecting each remote client, job shaper 206 "marks" the remote client as having been selected (block 910).

The job shaper 206 then determines whether one of two conditions is met. One condition is whether the selected remote client's estimated traffic is below a predetermined threshold (B), such as 10 Mbps (block 912). This threshold can be between 1 Mbps and 1 Gbps. If the estimated traffic for the selected remote client is below the predetermined threshold B, then the global broker 202 unmarks the selected remote client (916) and send the traffic for all unmarked remote clients to the small token bucket (block 918). If the traffic is not below the threshold B, then the global broker 202 determines whether the combined traffic for all marked remote clients is greater than a predetermined fraction (F) of the total traffic (T) (914). If so, the global broker sends the traffic for all unmarked remote clients to the small token bucket (block 918). For example, the predetermined fraction (F) may be set for 98% of total traffic, so that approximately 2% of total network traffic is sent to the small token bucket. If neither of the conditions for block 912 and block 914 is met, then the global broker 202 selects the next unmarked remote client on the list (block 908) and repeat the process for the newly selected remote client.

It should be appreciated that while the flow diagram of FIG. 9 illustrates the process blocks occurring in a particular order, some of the blocks may actually occur in a different order. In addition, process blocks may be added or deleted and still be consistent with some implementations. For example, either block 912 or block 914 may be removed, so as to require only one condition before traffic is placed into the small token bucket.

By using process 900, the bandwidth enforcer 200 may individually allocate bandwidth for all of the large remote clients. Specifically, the bandwidth enforcer 200 may implement the waterfill process 300 and the progressive filling process 700 for the shared-service applications that are running on behalf of each large remote client, however in this instance, the "child principal" identifies a specific remote client as being the "user" for purposes of the data transmission. Accordingly, two or more remote clients (e.g., remote clients 808 and 810) may be running the same shared-service application 829 on host system 802, with each remote client being assigned a different weight value. For example, remote client 808 may be assigned a weight value of 0.4, while remote client 810 is assigned a weight value of 0.2. In this way, the bandwidth allocated for the data transmissions associated with remote client 808 may be twice as large as the bandwidth allocated for remote client 810. Conversely, all of the "small" remote clients are assigned bandwidth as one entity, in that they are sent to the same token bucket and assigned bandwidth under a single allocation policy. It should be appreciated that the classification of the remote clients as large or small does not necessarily need to be performed by the global broker 202. This process could be performed by any device on the network suitable for being programmed to perform the classification process. For example, process 900 could occur on at each network site and be implemented by site brokers 204.

The memory/storage may be of any type or any device capable of storing information accessible by the processor, such as a hard-drive, ROM, RAM, CD-ROM, flash memories, write-capable or read-only memories. The processor 324 may comprise a commercial CPU of a personal computer. Alternatively, the processor may be a dedicated controller for executing operations, such as an ASIC or other processing device.

The instructions 828 may comprise any set of instructions to be executed directly (such as machine code) or indirectly (such as scripts) by the processor(s). In that regard, the terms "instructions," "steps" and "programs" may be used interchangeably herein. The instructions may be stored in any computer language or format, such as in object code or modules of source code. The functions, methods and routines of instructions in accordance with the present implementations are explained in more detail below.

Data 830 may be retrieved, stored or modified by processor 824 in accordance with the instructions 828. The data may be stored as a collection of data. For instance, although the described implementations are not limited by any particular data structure, the data may be stored in computer registers, in a relational database as a table having a plurality of different fields and records, in a web page cache, as XML documents, etc.

The data may also be formatted in any computer readable format such as, but not limited to, binary values, ASCII or Unicode. Moreover, the data may include any information sufficient to identify the relevant information, such as descriptive text, proprietary codes, pointers, references to data stored in other memories (including other network locations) or information which is used by a function to calculate the relevant data. Furthermore, a given item may comprise one or more files, a data set stored in a database, a web cache, etc. Depending on the size and content of the data, parts thereof may be stored or otherwise maintained separately.

Although the processor 824 and memory 826 are functionally illustrated in FIG. 8B as being within the same block, it is understood that the processor and memory may actually comprise multiple processors and memories that may or may not be stored within the same physical housing or location. For example, some or all of the instructions and data may be stored on a removable CD-ROM, DVD-ROM or flash drive, and others within a read-only computer chip. Some or all of the instructions and data may be stored in a location physically remote from, yet still accessible by, the processor. Similarly, the processor may actually comprise a collection of processors which may or may not operate in parallel. Data may be distributed and stored across multiple memories 826 such as hard drives or the like.

In one aspect, server 804 may communicate with one or more client computers 802, 806 and/or 808, as well as devices such as mobile phone 810 and PDA 812. Each client computer or other client device may be configured similarly to the server 804, with a processor, memory and instructions, as well as one or more user input devices 818, 820 and a user output device, such as display 822. Each client computer may be a general purpose computer, intended for use by a person, having all the components normally found in a personal computer such as a central processing unit ("CPU"), display, CD-ROM or DVD drive, hard-drive, mouse, keyboard, touch-sensitive screen, speakers, microphone, modem and/or router (telephone, cable or otherwise) and all of the components used for connecting these elements to one another.

The server 804, user computers and other devices are capable of direct and indirect communication with other computers, such as over network 816. Although only a few computing devices are depicted in FIGS. 8A-B, it should be appreciated that a typical system can include a large number of connected servers and clients, with each different computer being at a different node of the network. The network 316, and intervening nodes, may comprise various configurations and protocols including the Internet, intranets, virtual private networks, wide area networks, local networks, private networks using communication protocols proprietary to one or more companies, Ethernet, WiFi, Bluetooth or TCP/IP.

Communication across the network, including any intervening nodes, may be facilitated by any device capable of transmitting data to and from other computers, such as modems (e.g., dial-up or cable), network interfaces and wireless interfaces. Server 804 may be a web server.

Moreover, computers and user devices in accordance with the systems and methods described herein may comprise any device capable of processing instructions and transmitting data to and from humans and other computers, including network computers lacking local storage capability, PDA's with modems such as PDA 812, Internet-capable wireless phones such as mobile phone 810, netbooks and pad-type handheld computers.

Although particular implementations have been described, it is to be understood that these implementations are merely illustrative of the principals and applications described. It is therefore to be understood that numerous modifications may be made to the illustrative implementations and that other arrangements may be devised.

The invention claimed is:

1. A method of allocating bandwidth over a network, the method comprising:
   receiving, on a network, a request for a shared-service application to run on a host device on behalf of a plurality of remote clients;
   receiving an estimation of a volume of network traffic associated with running the shared-service application for each remote client;

classifying the plurality of remote clients, based at least in part on the received estimation, as either being in a first classification or a second classification, wherein classifying the plurality of remote clients includes:
  aggregating the estimation of the volume of network traffic associated with each of the remote clients to create a network traffic total;
  selecting at least some of the plurality of remote clients in an order of descending estimation of the volume of network traffic;
  upon selecting each remote client, aggregating the estimation of the volume of network traffic for all selected remote clients;
  stopping the selection of remote clients when the selected remote clients have an aggregated estimation of the volume of network traffic that is above a predetermined fraction of the network traffic total;
  classifying all selected remote clients into the first classification; and
  classifying all remote clients that have not been selected into the second classification;
transmitting classifications of the plurality of remote clients to the host device; and
allocating bandwidth for the shared-service application, wherein remote clients classified with the first classification are allocated bandwidth individually, and wherein the remote clients classified with the second classification are provided bandwidth as part of a group.

2. The method of claim 1, wherein classifying the plurality of remote clients includes:
  determining whether the estimation of the volume of network traffic for each remote client is below a predetermined threshold;
  classifying all remote clients having estimation of the volume of network traffic that is not below the predetermined threshold with the first classification; and
  classifying all remote clients having estimation of the volume of network traffic that is below the predetermined threshold with the second classification.

3. The method of claim 1, wherein allocating bandwidth includes providing bandwidth for each remote client having the first classification based at least in part on one of a plurality of weight values associated with each of the remote clients.

4. The method of claim 1, further comprising:
  receiving bandwidth usage information for a plurality of applications running on behalf of a plurality of clients, including the shared-service application running on behalf of the plurality of remote clients;
  aggregating bandwidth usage information to determine a total bandwidth demand;
  detecting congested links within the network; and
  dividing the network's available bandwidth between the plurality of applications based, at least in part, on a weight value associated with the remote clients.

5. The method of claim 4, wherein the bandwidth demand information is based on peak bandwidth usage of the plurality of applications over a predetermined time period.

6. The method of claim 4, further comprising:
  determining that all network bandwidth demand is being met;
  determining that unused bandwidth is available on the network; and
  dividing the unused bandwidth among the plurality of clients in proportion to the client's weight values.

7. The method of claim 4, wherein a portion of network bandwidth remains exempt from the operations to create bandwidth allocations.

8. The method of claim 4, wherein a subset of the clients receive a permanent allocation of bandwidth.

9. A network device for allocating bandwidth over a network, the device comprising:
  a memory; and
  a processor coupled to the memory, the processor configured to execute instructions to:
    receive a request for a shared-service application to run on a host device on behalf of a plurality of remote clients;
    receive an estimation of a volume of network traffic associated with running the shared-service application for each remote client;
  classify the remote plurality of clients, based at least in part on the received estimation, as either being in a first classification or a second classification, wherein classifying the plurality of remote clients includes:
    aggregating the estimation of the volume of network traffic associated with each of the remote clients to create a network traffic total;
    selecting at least some of the plurality of remote clients in an order of descending estimation of the volume of network traffic;
    upon selecting each remote client, aggregating the estimation of the volume of network traffic for all selected remote clients;
    stopping the selection of remote clients when the selected remote clients have an aggregated estimation of the volume of network traffic that is above a predetermined fraction of the network traffic total;
    classifying all selected remote clients into the first classification; and
    classifying all remote clients that have not been selected into the second classification;
  transmit classifications of the plurality of remote clients to the host device; and
  allocate bandwidth for the shared-service application, wherein remote clients classified with the first classification are allocated bandwidth individually, and wherein the remote clients classified with the second classification are provided bandwidth as part of a group.

10. The device of claim 9, wherein the processor is further configured to execute instruction to:
  determine whether each of the remote client's estimation of the volume of network traffic is below a predetermined threshold;
  classify all remote clients having estimation of the volume of network traffic that is not below the predetermined threshold with the first classification; and
  classify all remote clients having estimation of the volume of network traffic that is below the predetermined threshold with the second classification.

11. The device of claim 9 wherein instructions to allocate bandwidth includes providing bandwidth for remote clients having the first classification based, at least in part, on one of a plurality of weight values associated with each of the remote clients.

* * * * *